Sept. 11, 1951

H. SHERMAN 2,567,449

TELEPHONE PAD ATTACHMENT

Filed May 20, 1948

INVENTOR.
HARRY SHERMAN
BY
Zoltan Polachek
ATTORNEY

Patented Sept. 11, 1951 2,567,449

UNITED STATES PATENT OFFICE 2,567,449

TELEPHONE PAD ATTACHMENT

Harry Sherman, Brooklyn, N. Y.

Application May 20, 1948, Serial No. 28,210

1 Claim. (Cl. 40—10.5)

This invention relates to new and useful improvements in a telephone pad attachment.

More specifically, this invention proposes the construction of a telephone pad attachment characterized by a bracket for engagement about the base of the telephone and having a pair of forwardly extending lugs for pivotally supporting a plate in a manner so that the plate may be moved between a position overlying the dial of the telephone or extended forwardly of the base of the telephone.

Another object of the present invention proposes the provision of a pad on one face of the plate which is exposed when the plate overlies the dial of the telephone in a manner to enable one to take down notes while talking on the telephone.

Still another object of the present invention proposes the provision of a telephone number index book mounted on the other face of the plate which is exposed when the plate is moved to a position extended forwardly of the base of the telephone in a manner so that the user of the telephone may look up a number in the book and conveniently dial the desired number while the plate is extended forwardly.

A further object of the present invention proposes the provision of a novel means for simultaneously tightening the bracket in position on the base of the telephone and drawing the forwardly extending lugs together to frictionally grip the plate in a manner to hold the plate into positions into which it may be moved.

A modification of the present invention proposes the provision of a novel means for restraining movement of the plate toward the dial of the telephone in a manner to support the plate in a position in which the telephone number index book will be out of contact with the dial of the telephone.

Still another object of the modified form of the invention proposes the provision of means for limiting forward movement of the plate in a manner to support the plate in a convenient forwardly extended horizontal position in which the telephone number index book may be conveniently used.

It is a further object of this invention to construct a telephone pad attachment which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 3, 4, 5, 6, 7, 8:
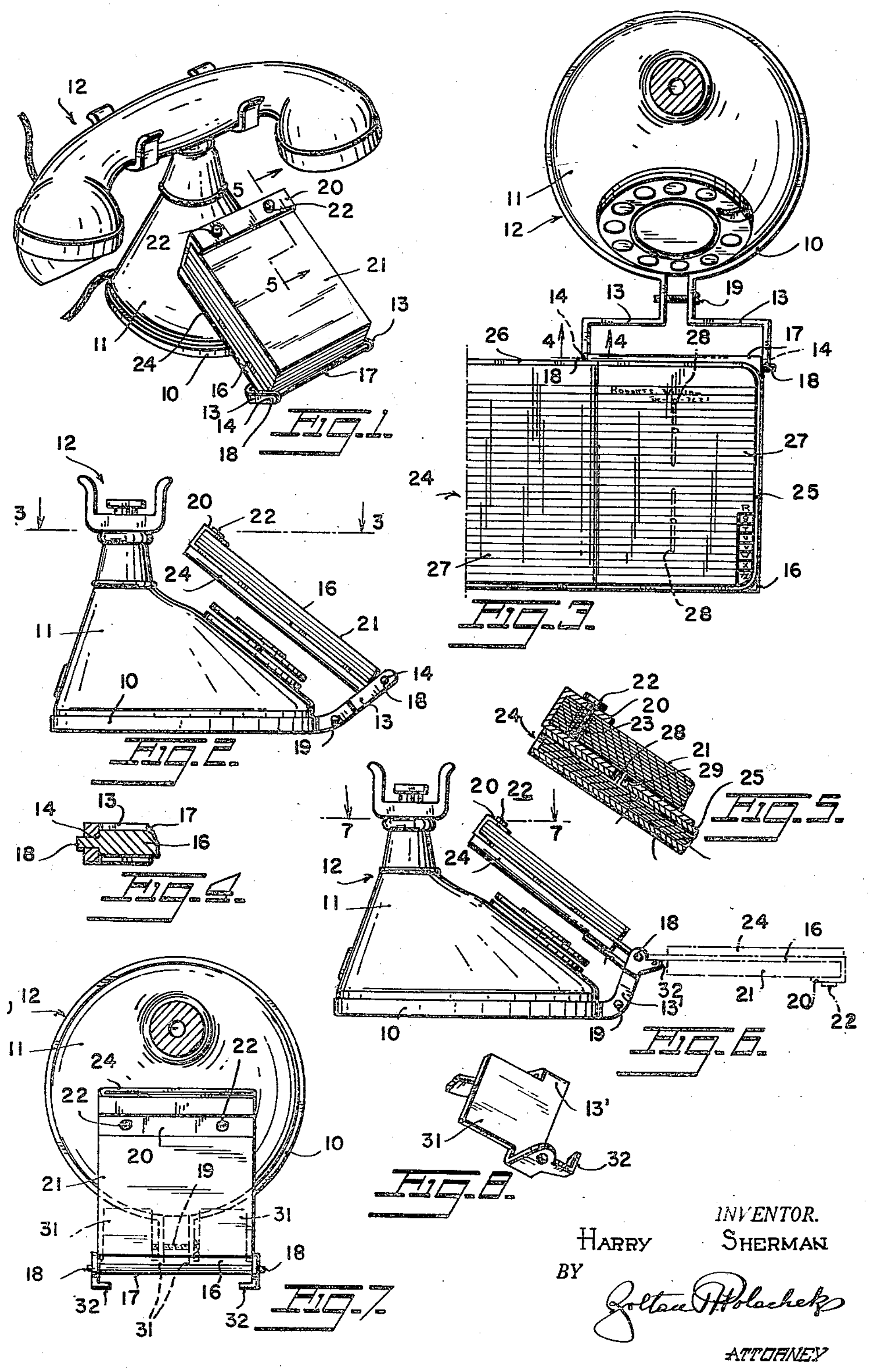
Fig. 1 is a perspective view of a telephone provided with a telephone pad attachment in accordance with the present invention.
Fig. 2 is a side elevational view of Fig. 1, but with the hand set of the telephone omitted.
Fig. 3 is a sectional plan view taken on the line 3—3 of Fig. 2, but with the plate moved to its forwardly extended position and the telephone number index book opened and partially broken away.
Fig. 4 is an enlarged partial sectional view taken on the line 4—4 of Fig. 3.
Fig. 5 is an enlarged partial longitudinal sectional view taken substantially on the line 5—5 of Fig. 1.
Fig. 6 is a side elevational view similar to Fig. 2, but illustrating a modification of the invention.
Fig. 7 is a sectional plan view taken on the line 7—7 of Fig. 6.
Fig. 8 is a perspective view of one of the supporting lugs of the bracket.

The telephone pad attachment, according to the present invention, includes a bracket 10 for engagement about the base 11 of a conventional telephone 12. On the drawing, the bracket 10 is illustrated as being substantially round so as to fit snugly about the round base 11 of the telephone shown. However, it is appreciated that the shape of the bracket 10 may be varied in accordance with the shape of the base of the telephone for which the bracket is being manufactured.

The ends of the bracket 10 continue into forwardly extending lugs 13, and the free ends of the lugs 13 are formed with openings 14. A plate 16 is formed at one end with an enlarged edge 17 and trunnions 18 extend laterally from the ends of the enlarged edge 17. The trunnions 18 are received in the openings 14 of the lugs 13 so as to pivotally support the plate on the lugs 13.

Means is provided for securing the bracket 10 securely in position on the base 11 of the telephone 12 and for simultaneously drawing the lugs 13 into frictional engagement with the ends of the enlarged edge 17 of the plate 16 so as to frictionally hold the plate 16 in any position into which it is moved. The means comprises a screw 19 which passes freely through an opening in one of the lugs 13 and which threadedly engages a complementary opening in the other lug 13 to draw the lugs together when the screw 19 is tightened in position.

The opposite end of the plate 16 from the enlarged edge 17 is formed with an overhanging flange 20 which extends across the top end of a pad 21. The pad 21 rests on what is the top face of the plate 16 when the plate overlies the dial of the telephone 12. The pad 21 is secured in position by several removable screws 22 which threadedly engage through the flange 20 and which extend through complementary openings 23 formed in the pad 21. As shown in Fig. 5, the bottom ends of the screws 22 merely engage the top face of the plate 16. To replace the pad 21 with a similar new pad it is merely necessary to remove the screws 22 and position the new pad on the plate 16 and return the screws 22 to their normal position.

With the plate 16 overlying the dial of the telephone 12 as shown in Figs. 1 and 2, it will be appreciated that the pad 21 will be available to one using the telephone, for taking down notes while talking on the telephone.

The back face of the plate 16 is provided with a conventional telephone number index book 24 having the usual back cover 25, front cover 26 and indexed pages 27. The back cover 25 of the index book 24 is secured to the back face of the plate 16 by several paper fasteners 28, see Figs. 3 and 5. The paper fasteners 28 are passed through aligned openings 29 formed in the plate 16, see Fig. 5 and openings 30 formed in the back cover 25 of the index book 24 and then have their prongs bent to extend parallel to the back cover 25.

When the plate 16 overlies the dial of the telephone, the index book 24 is sandwiched between the dial and the back face of the plate 16, as shown in Figs. 1 and 2. When the plate 16 is moved to extend forwardly of the base 11 of the telephone 12, as shown in Fig. 3, the index book 24 and the dial of the telephone are then exposed. In this position, a desired number may be conveniently looked up in the book 24 and the number dialed before the plate 16 is moved back to its position overlying the dial so as to expose the pad 21 for taking down notes while talking on the telephone.

In the modification of the invention shown in Figs. 6 to 8, the lugs 13' of the bracket 10 are formed with means for supporting the plate 16 in a position in which the front cover 26 of the telephone number index book 24 will be out of contact with the dial of the telephone when the plate 16 overlies the dial of the telephone. The lugs 13' in this form of the invention are further provided with means for restraining forward movement of the plate 16 so as to support the plate in a forwardly extended horizontal position in which the index book 24 may be conveniently viewed.

The means for supporting the plate 16 in a position in which the front cover 26 of the index book 24 will be out of contact with the dial of the telephone, comprises projecting plates 31 integrally formed with the lugs 13' and which extend toward the dial of the telephone 12 to engage beneath the front cover 26 of the index book 24 when the plate overlies the dial, as shown in Figs. 6 and 7. With the plate 16 thus supported, all pressures on the pad 21 while writing thereon are taken up by the lugs 13' and bracket 10 as the index book 24 on the bottom face of the plate 16 is supported clear of the dial of the telephone.

The lugs 13' of the bracket 10 are also provided with forwardly and inwardly bent projections 32 which are disposed to engage beneath the top face of the plate 16 when the plate is pivoted to the forwardly extended position shown by the dot and dash lines in Fig. 6. These projections 32 form the means for supporting the plate 16 in the horizontal forwardly extended position, as shown in Fig. 6, in which the index book 24 may be conveniently viewed.

It is pointed out that as in the previous form of the invention the screw 19 holds the lugs 13' in a position in which they frictionally bear against the ends of the enlarged edge 17 of the plate 16 to frictionally hold the plate in desired moved position, and that the plates 31 and the projections 32 merely assist the frictional resistance in holding the plate 16 in either of its two extreme pivoted positions.

In other respects this form of the invention is similar to that previously described, and like numbers identify like parts in each of several views.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In a telephone pad attachment having a bracket for encircling the base of a telephone and a plate upon one side of which a pad is mounted and upon the other side of which a telephone number index book is mounted, the bracket at the front of the base having outwardly directed horizontal arm portions, said arm portions continuing at their outer ends into upwardly directed end portions, means pivotally mounting one edge of the plate between said end portions to be pivoted rearwardly to a position overlying the base to expose the pad or pivoted to a position extended forward from the base to expose the index book, means supporting the plate in its position overlying the base, and means supporting the plate in its position extended forward from the base, said first supporting means comprising plates projected rearwardly from said arm portions and upon which the plate rests.

HARRY SHERMAN.

REFERENCES CITED

The following references are of record in the file of this patent:

UNITED STATES PATENTS

| Number | Name | Date |
|---|---|---|
| 407,366 | Mix | July 23, 1889 |
| 875,151 | Case et al. | Dec. 31, 1907 |
| 1,281,840 | Roffy | Oct. 15, 1918 |
| 1,824,628 | Schmalz | Sept. 22, 1931 |
| 2,046,268 | Keller | June 30, 1936 |